United States Patent [19]
Russell

[11] 3,809,477
[45] May 7, 1974

[54] MEASURING APPARATUS FOR SPATIALLY MODULATED REFLECTED BEAMS

[75] Inventor: James T. Russell, Richland, Wash.

[73] Assignee: The United States of America as represented by the Secretary of the Interior, Washington, D.C.

[22] Filed: Nov. 1, 1972

[21] Appl. No.: 302,960

[52] U.S. Cl. .................... 356/5, 356/141, 356/152, 356/172
[51] Int. Cl. .......................................... G01b 11/26
[58] Field of Search ............ 356/4, 5, 141, 152, 172

[56] References Cited
UNITED STATES PATENTS

| 3,348,050 | 10/1967 | Bez ......................................... 356/4 |
| 3,452,207 | 6/1969 | Tsukkerman ....................... 356/172 |
| 3,733,134 | 5/1973 | Kadoya ............................... 356/152 |
| 3,504,979 | 4/1970 | Stephany ............................ 356/172 |

Primary Examiner—Richard A. Farley
Assistant Examiner—S. C. Buczinski
Attorney, Agent, or Firm—Thomas Zack; Frank A. Lukasik

[57] ABSTRACT

A modulated displacement indicator and its method of use that utilizes unfocused electromagnetic waves, like laser waves, which are spatially modulated. Either an angular direction or linear displacement can be obtained depending on whether the beam is divergent or parallel. In any case, the beam is modulated two dimensionally and then transmitted to a reference phase detector. This may be accomplished by a semitransparent mirror which functions as a beam splitter. One of the segments from the splitter is fed directly into the aperture of the reference detector to determine the phase at the center of the spatially modulated transmitted wave. Another of the beam segments can be transmitted through the beam splitter to a remote reflective target aperture. Part of the reflected beam is detected by a signal detector. The outputs from the reference and signal detectors then have their phase relationships compared electronically. If the transmitted beam is of a known parallel width, the phase difference may be used to obtain the distance from the center of the beam to the target aperture. Should the beam be divergent, the phase difference can lead to a determination of the angle formed by the beam center line defined by the reference detector as one of its legs and the straight line to the target as the other leg.

In one practical embodiment of my invention several spaced reflective targets are randomly fixed to the surface of a rigid structure, like the interior walls of a mine. A transmitted parallel laser beam modulated and detected as indicated, is sequentially directed by a motor operated deflector to impinge on each of the targets in a predetermined order. Reflected beams from each target are then detected by the signal detector and the phase relationship between the transmitted and reflected beams ascertained to give the distances from the laser beam center line to the target. By comparing reference readings for each target individually and as a group to subsequent readings, variations in the distance between the targets can be noted. The constant monitoring of such minute variations of the targets tells the observer of variations in the attached rigid structure. Should these variations exceed a predetermined safety level, like excess deformation of a inner mine wall, a signal or other indicating device can be triggered.

10 Claims, 7 Drawing Figures

PATENTED MAY 7 1974 3,809,477

MEASURING APPARATUS FOR SPATIALLY MODULATED REFLECTED BEAMS

FIELD OF THE INVENTION

This invention relates to electro-optical measuring apparatus and methods. More specifically it is concerned with spatially modulated beams that are reflected off remote targets to determine angular displacements or distances.

DESCRIPTION OF THE PRIOR ART

Electro-optical measuring systems that employ modulated electromagnetic waves, like laser beams, to measure distances to targets are known. For example, in the U.S. Pat. No. 3,520,607 issued July 14, 1970 to Robert M. Zoot, such a system is disclosed. However, there must be some focusing of the reflected beam to ascertain the desired measurement because the modulation is in the same direction as the transmitted beam. In contrast, no focusing of the reflected beam is required by my invention as the spatial modulation is generally perpendicular to the transmitted beam and this modulation itself is used as the measure. As such, it is a distance independent system that measures angular variations within the beam itself. Optical diffraction effects as well as intensity losses due to dust or the like will not degrade accuracy as in a system dependent on focusing the reflected beam.

SUMMARY OF THE INVENTION

In this invention a system for making beam angular measurements employs an unfocused spatially modulated beam whose modulation direction is generally perpendicular to the beam transmission direction. After a reference detector detects the transmitted modulation phase at a particular arbitrary point in the beam cross section, the beam is reflected from a remote target. A second (signal) detector determines the phase of the reflected beam and a phase detector then compares the electrical phase relationship between the two signals. This measurement allows a determination of the angular displacement of the reflected beam relative to the center line or other arbitrary line of the transmitted beam.

The primary object of this invention is an improved spatially modulated measuring system that employs unfocused beams.

A secondary object is such an improved spatially modulated system used to measure displacements of remote reflective targets.

Still another object is such a system that not only measures distances perpendicular to the beam direction but also calculates relative movements between a series of measured distances.

These and other objects and advantages of the present invention will become more fully apparent from the following detailed description of the invention set forth herein and from the accompanying drawing made a part hereof in which:

FIG. 1 schematically illustrates the basic set-up of my invention.

FIG. 2 schematically illustrates the system of FIG. 1 with a parallel beam.

FIG. 3 shows how the beam intercepts the modulator.

FIG. 4 graphically describes the modulated graph of the FIG. 2 apparatus.

Figure 1:
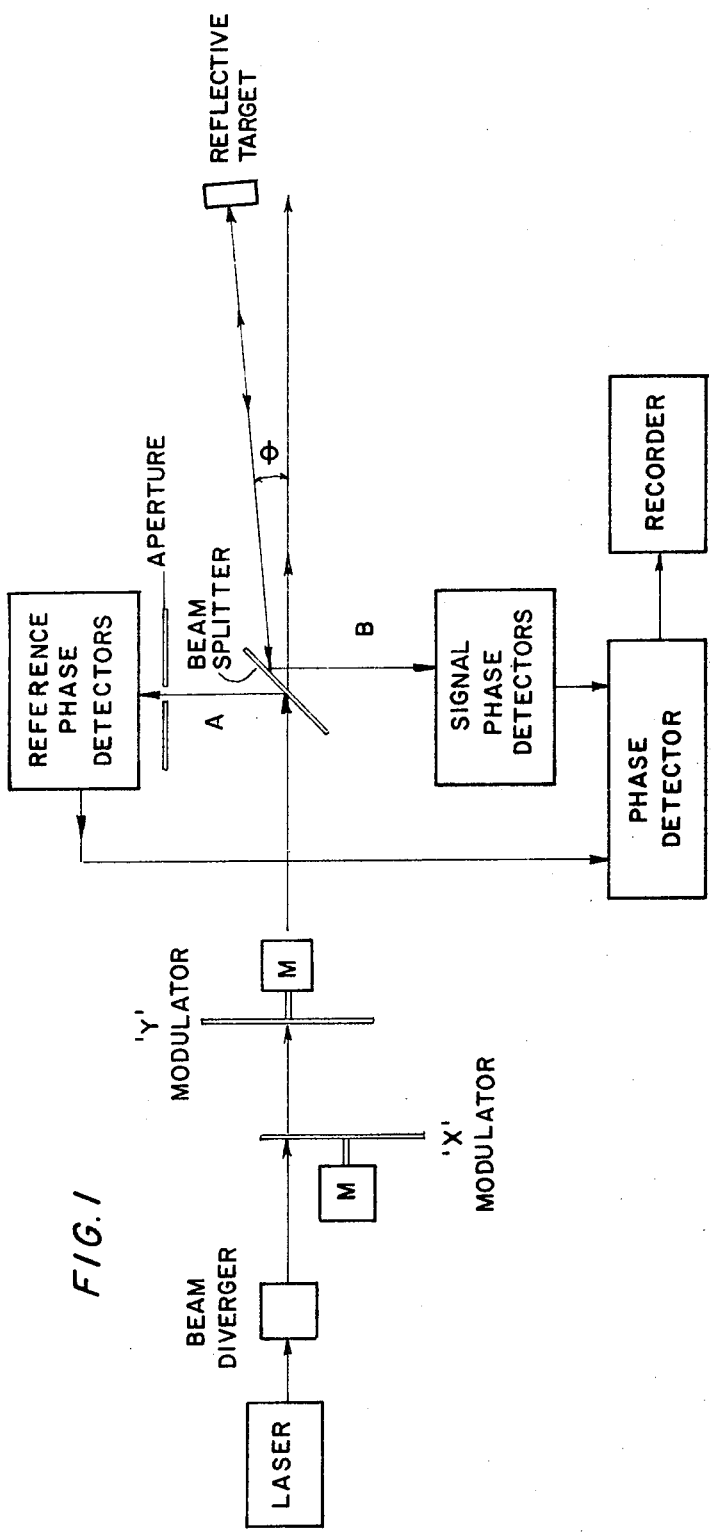

The FIG. 1 system shows the preferred embodiment of the basic components of my invention. In this setup the directable transmitted beam is divergent and the measurement sought to be measured is the angle $\theta$ representing the angle between the center line of the transmitted beam and a straight line to the target from the laser beam diverger. The target may be an aperture placed over a corner cube reflective target also known as a tetrahedral prism that is rigidly fixed to a distance object. The object may be moving or stationary relative to the laser source. The coherent parallel beam from the laser is made divergent to fill what may be termed a symmetrically shaped cone pattern. The center line of the beam would extend from the laser beam diverger (apex of the cone) to the center of the beam pattern. The reference detector would ordinarily be on this line. Alternatively, the position of the reference detector defines the "center," i.e., reference line. The straight line from the target would extend from the laser to the center of the aperture of the corner cube target.

Figure 3:
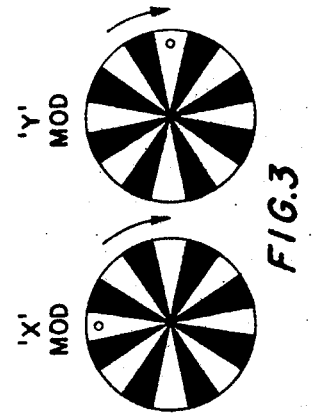

The X and Y modulators are basically the same and consist, in the preferred embodiment, of two parallel circular wheel members with each member being rotated by a separate variable speed motor. The wheels have their largest surfaces in parallel vertical planes but their center axes in different horizontal plane as the laser beam intersects the beam perpendicular to its transmitted direction near its rotating outer edge. The modulator also intersects the beam perpendicular to the direction of its transmission but has its center axis in a lower horizontal plane and is in the same vertical plane as the laser beam. FIG. 3 illustrates how these intersections take place by showing a front view of the laser beam as viewed from the target and how the modulators are oriented with respect thereto.

Each modulator wheel consists of alternate laser transmitting and blocking opaque segments (see FIG. 2) that are of the same width when measured the same distance out from the modulator center axis. As the motor for each modulator rotates its respective wheel about its central axis, the transmitted laser beam is spatially modulated in the X and Y direction. As is usually the case, if the speed of each modulator wheel is made different from the other, the temporal frequency of spatial modulation intensity will be different for the two coordinates directions.

It is important to note that the basic laser beam has not had its transmission frequency changed. The laser beam acts as a carrier beam that has its intensity modulated perpendicular to its direction of transmission. When observed from the target, the beam would appear to have shadows passing across it at a frequency dependent on the speed of rotation of the modulator wheels. It is the progress of this variation in intensity perpendicular to the transmitted beam at different coordinate frequencies which consitutes the spatial modulation.

After the transmitted laser beam is modulated it may impinge upon a beam splitter. As the name indicates, this device splits the beam into at least two segments, one of which is transmitted in a straight line to the target and another of which is split off. The back of this device also serves the function of diverting a portion of the reflected beam from the target as will be explained hereafter. A semitransparent mirror may be used to accomplish this purpose of splitting and transmitting the beam.

One of the split-off beam segments is fed to a transmitter phase detector positioned perpendicular to the path of the transmitted beam. A photomultiplier tube may function as the detector or other equivalent devices such as a silicon solar cell, a phototransistor, or PIN diode could also be used as the detector. Background room lights and other sources of interference may also be reduced by a narrow band pass filter. Whatever type is used the function of this first detector, also referred to as a reference detector, is to detect the phase of the spatial modulation of the beam before it reaches its target. It also defines the center line of the beam for reference purposes.

Opposite the first detector is a similar second detector, referred to as the signal detector, that receives part of the reflected beam back from the target after it strikes the mirror on the back of the beam splitter and detects its spatially modulated phase. As is the case with the reference detector, a photomultiplier tube or its functional equivalent could be used for the signal detector. Readings from the reference detector and signal detector are fed to a common phase detector which measures the electrical phase relationship between the two beams.

Each of the described detectors, whether it be a reference or signal detector, is concerned with detecting the spatial modulation in only one of the X or Y coordinate directions. Two sets of tuned band pass filters would be needed to separate the different frequencies in the X and Y directions. Readings on the detectors would be in volts (FIG. 3) and about five volts peak to peak with a time frequency of about .005 seconds peak to peak. However, it is not the actual voltage readings from the detectors that is important but the phase relationship or absolute phase difference between two sets of detector readings—one set for each of the coordinates.

To illustrate how the phase difference readings allow determination of the desired distance or angular measurements the two beam situations should be examined. In the parallel beam situation, the distance sought to be measured is from the beam center line to the target. Since the modulation is perpendicular to the transmitted beam, the measurement would also be perpendicular to the beam center line. By knowing the difference in readings it is possible to relate the values to specific electrical phase angle difference from 0° to 180° representing the largest phase angle reading value. To translate the $\gamma$ angular reading to a distance measurement from the beam center, the ratio of the phase difference reading obtained to 180 is multiplied by the beam radius. Mathematically $d$, the perpendicular distance from the beam center to the target, could be represented as follows:

$$d = \gamma/180 \; r$$

where $r$ is the radius of the beam and $\gamma$ the electrical phase detector reading in degrees. It should be mentioned that the maximum phase difference reading is determined in the initial set up of the system by moving the beam center away from the target center until the signal phase detector first receives no reflected beam from the target.

When the beam is divergent, the real angular measurement $\theta$ is arrived at by the formula:

$$\alpha/180 \cdot \gamma = \theta$$

where $\gamma$ is the electrical phase detector reading in radians or degrees and $\gamma$ the maximum divergent angle (same units as $\gamma$) as measured from the beam center to the edge of the beam. This latter angle ($\alpha$) is usually a fixed value and is determined by the maximum reflected angle from the target to the signal detector.

Besides the mentioned possible variations, the reference detector may be a photodiode that has its output amplified prior to being inputted to the phase detector. A small circular aperture about 10 mils wide may also be placed in the beam path in front of this detector to identify a specific position of the modulated beam as the center line or other reference. The recorder of FIG. 1 may be a strip chart recorder that allows signal to be observed against a time plot.

Figure 2:
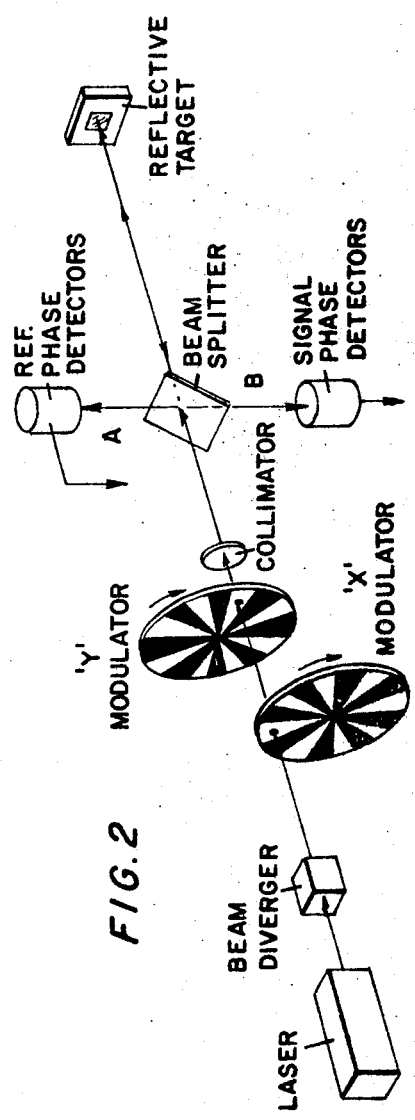
Figure 7:
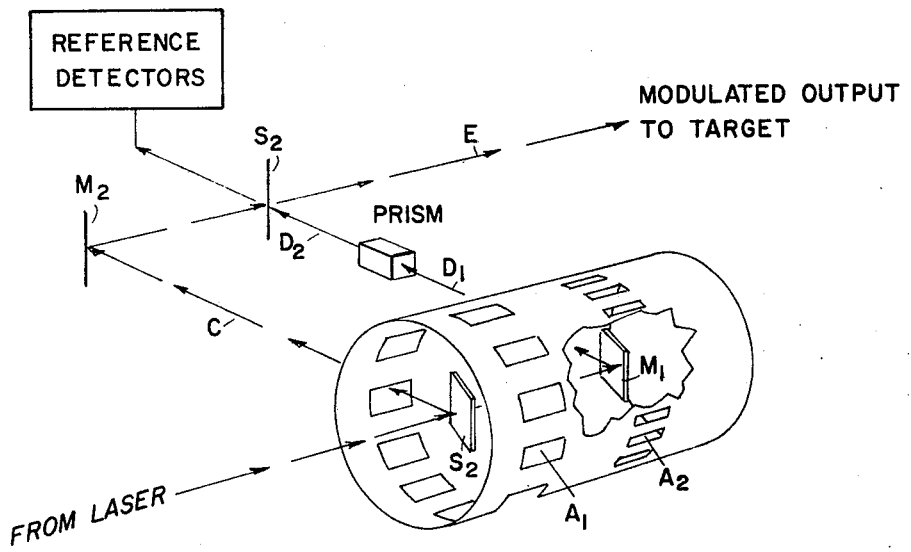
FIG. 7 shows another embodiment for the beam modulator.

FIG. 7 shows an alternate form of a spatial modulator that can be used in place of the modulator wheels of FIGS. 1 and 2. In the FIG. 7 embodiment one motor rotatable drum member is used in place of the two X and Y modulator wheels. The drum has two rows $A_1$ or $A_2$ of light-transmitting areas or slots to allow for the transmission of the light beam at different frequencies. As the beam enters the center of the drum from the beam source it first impinges upon a beam splitter $S_1$ that functions like the beam splitter previously described in the FIG. 1 embodiment. Part of the beam C is then transmitted to a mirror $M_2$ and reflected to a second beam splitter $S_2$. $S_2$ is equivalent to the beam splitters of FIGS. 1 and 2 and performs the same function. It may also be substituted for the same. The two rows $A_1$ and $A_2$ of circular light transmitting areas on the drum periphery can be spaced different distances apart for each row with each row having the same spacing between adjacent areas. If the number of areas in one row, say $A_2$, is greater than the other row $A_1$ the temporal frequency of modulated light intensity would be greater for the transmitted beam. Hence beam $D_1$ would be modulated at a higher frequency than C. The prism that beam $D_1$ is directed to may be a dove prism that rotates the beam $D_1$ 90° to give the resultant beam $D_2$. When compared to beam C, beam $D_2$ would then be 90° different and the opposite coordinate. While there is no modulation in the X or Y direction performed by the rotating drum in an absolute sense, the beams C and $D_2$ that impinge on beam splitter $S_2$ would be 90° oriented with respect to each other and either could be arbitrarily chosen as the X or Y coordinate. Whichever is picked the result is the same, namely a two dimensional spatial intensity modulated beam whose plane of modulation is perpendicular to its direction of transmission. This beam is then split so that its reference detectors can determine its center line and its modulation in the X and Y direction as was the FIG. 1 situation. Beam E represents the portion of the laser input sent to the target from splitter $S_2$.

Figure 6:
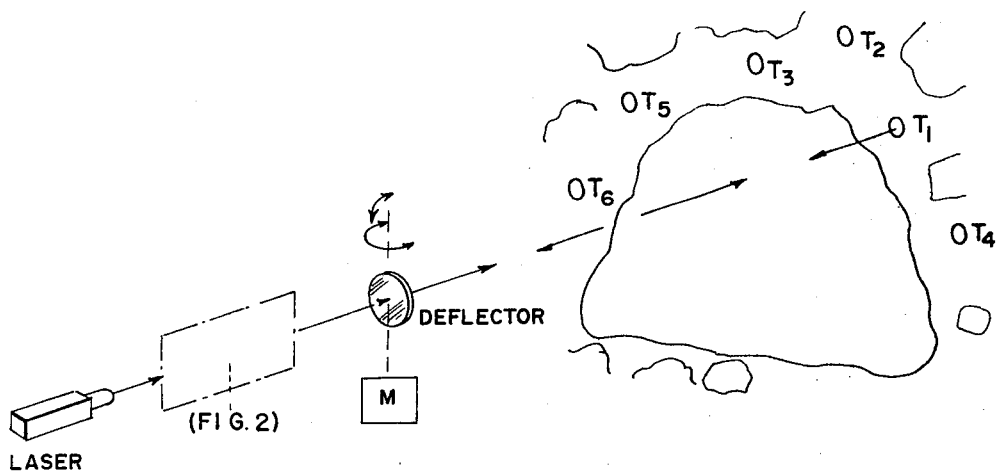
FIG. 6 illustrates a practical embodiment of the use of my invention.

While the systems shown in FIGS. 1, 2 and 6 all employ beam splitters to detect the phase modulation in the X and Y directions this same detection function could be accomplished by many other ways without actually splitting the modulated beam. In other words, a phase detector could be placed in the straight line path of the modulated beam without causing it to be diverted. Further, the way the modulating drum of FIG. 7 or wheels of FIGS. 1 and 2 actually accomplish the modulation could also vary by providing transmitting areas that sinusoidally vary the beam intensity in a gradual manner rather than providing alternate areas that are either light transmitting or opaque as previously described.

Figure 4:
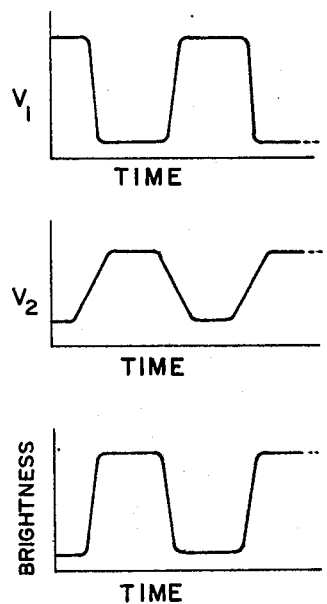
Figure 5:
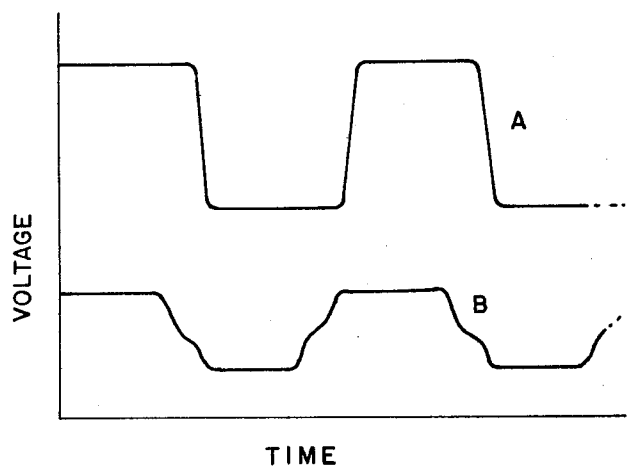
FIG. 5 shows a graphical analysis of the reference and reflected signals of FIG. 2.

The FIG. 2 is the same system as FIG. 1 except that a collimator has been added to insure that the transmitted laser beam remains parallel until it impinges upon the target. Beams A and B, respectively, represent the inputs to the reference detectors and signal detectors and are shown plotted on an oscilloscope trace of FIG. 5. FIG. 4 also shows a modulation graph of the voltage from the reference detector ($V_1$) versus time and a plot of the signal detector voltage ($V_2$) versus time for one coordinate. The bottom plot in FIG. 4 represents brightness (intensity) of the modulated transmitted laser beam versus time also for one coordinate.

One practical embodiment of the principles embodied in my invention is shown in FIG. 6. The laser set up of FIG. 2 or FIG. 7 is provided with a parallel beam generating source and its other components. In addition, a beam deflector actuated by a unique precision motor is also used to sequentially scan the beam up and down the interior walls of the mine tunnel 1. A plurality of spaced reflective cube targets $T_1, T_2 \ldots T_6$ are rigidly attached to the mine wall and facing the laser source so that they may be impinged by its beam. In the actual working embodiment, a Model 124 laser manufactured by Spectra Physics Inc. of Mountain View, California was used to generate a parallel one inch diameter beam. The signal detector in the photomultiplier tube had a narrow band pass filter with a 632.8 m$\mu$ filter and a 30 A. band pass. Targets were located and measured to an accuracy of 5 mils by using a deflector unit capable of reproducing and locating the beam to a ratio .005 inches in 300 feet.

The exact details of the beam deflector form the subject matter of another invention. However, the deflector may be used with this invention to sequentially scan the targets in a predetermined order. The distances to each target from the beam center line are then determined as previously explained and noted for future reference. The memory bank of a computer system or other types of data storage device with an appropriate information retrieval interface could then be used to store these measurements for future use. If the accuracy of the reproducibility of the sequential scanning deflector is maintained, subsequent sets of scans on the fixed targets should reveal the same beam distances to the targets as the stored data within error limits variations. By constantly comparing the sets of beam center to target distances to prior sets of the same distances, using comparison circuits, deviations above predetermined limits can be used as triggering signals to indicate that the walls of the mine are deforming and perhaps collapsing. An appropriate warning signal would then be generated to stop work and investigate the cause of the deviations.

In no way is my invention limited to the one specific use illustrated in FIG. 6. Innumerable uses can readily be imagined especially where deformation of any rigid structure is critical. Within the error limit parameters established, as long as the distance between the laser source and targets are kept fixed variations in these measured distances can be attributed to movements within the structure itself.

In all of these cases disclosed, it should be understood the examples given are merely illustrations of specific embodiments of my present invention. None should be used to restrict the uses or apparatus used in my invention which is limited only by the scope of the claims that follow.

I claim:

1. An electro-optical measuring system comprising:

a beam source to generate an electromagnetic beam along a transmission path;

a beam diverger placed in the path of said generated beam;

means to spatially modulate the intensity of said beam substantially perpendicular to its path at a given location in the beam from the source;

means to detect the spatial modulation phase of the beam along a beam reference line;

a remote reflective target in the transmission path of said generated beam to reflect at least a portion of the transmission beam;

a signal phase detector to detect the spatial modulation phase of at least a portion of the reflected beam; and a phase detector connected to said reference and signal phase detectors to detect the phase relationship between said two detectors.

2. The system of claim 1 wherein said source is a laser source and said means to spatially modulate the beam comprises means to spatially modulate the beam in two planes substantially perpendicular to each other.

3. The system of claim 1 wherein said means to spatially modulate the beam comprises means to spatially modulate the beam in two planes substantially perpendicular to each other having a driven rotatable member with a plurality of beam transmitting areas.

4. The system of claim 3 wherein said beam transmitting areas comprise two rows of areas around the periphery of said member with one row having a larger number of areas than the other.

5. The system of claim 1 wherein said means to spatially modulate the beam comprises two separate motor driven rotatable members to modulate the beam in two mutually perpendicular planes, each of said members having a plurality of beam transmitting areas.

6. The system of claim 5 wherein each of said rotatable members can be driven at different rotation speeds to impart different modulation frequencies to said beam in said two perpendicular planes.

7. The system of claim 1 including a beam collimator in the transmission path between said target and beam diverger to cause a parallel beam to be transmitted.

8. The system of claim 7 wherein said beam generating source is a laser source and including means to determine the distance between the beam reference line and the beam portion that reflects from the target based on the phase detector reading.

9. A method of making a beam measurement comprising the steps of:

generating an electromagnetic beam along a transmission path;

spatially modulating said beam by varying its intensity in a direction substantially perpendicular to its transmission path;

detecting the modulation phase of the transmitted beam along the beam reference line;

reflecting the spatially modulated beam whose phase has been detected off a remote reflective target;

detecting the modulation phase of the reflected beam; and determining the modulation phase relationship of the transmitted and reflected modulated beams to each other.

10. The method of claim 9 including the additional steps of:

making the generated beam a parallel beam of known radius; and calculating the distance from the beam reference line to its reflected portion based on the determined modulation phase relationship and the beam's known radius.

* * * * *